United States Patent [19]

Erisman et al.

[11] 4,292,357
[45] Sep. 29, 1981

[54] ZINC/ZINC OXIDE LAMINATED ANODE ASSEMBLY

[75] Inventors: Lester R. Erisman; Robert A. Brown, both of Joplin, Mo.

[73] Assignee: Eagle-Picher Industries, Inc., Cincinnati, Ohio

[21] Appl. No.: 60,355

[22] Filed: Jul. 25, 1979

[51] Int. Cl.³ .......................... B32B 3/04; B32B 3/24; H01M 4/42; H01M 4/74
[52] U.S. Cl. .................................... 428/124; 156/226; 156/244.11; 427/115; 427/123; 427/126.3; 427/209; 428/138; 428/247; 428/256; 428/328; 428/469; 429/229; 429/231; 429/233; 429/245; 429/246
[58] Field of Search .................. 429/57, 60, 131, 231, 429/229, 232, 246, 190, 233, 241, 242, 245; 427/58, 61, 126, 115, 123, 209; 428/124, 539, 128, 469, 242, 256, 131, 137, 138, 247, 328; 156/221, 226, 227, 224.11

[56] References Cited

U.S. PATENT DOCUMENTS

| | | |
|---|---|---|
| 2,542,575 | 2/1951 | Ruben ................................ 429/57 |
| 2,594,709 | 4/1952 | Andre ............................ 429/229 X |
| 2,678,342 | 5/1954 | Porter ............................ 429/229 X |
| 2,851,509 | 9/1958 | Pasquale et al. .................... 429/131 |
| 2,993,947 | 7/1961 | Leger ............................ 429/190 X |
| 3,261,714 | 7/1966 | Kordesch .............................. 429/60 |
| 3,261,715 | 7/1966 | Solomon et al. ...................... 429/231 |
| 3,575,723 | 4/1971 | Jerabek et al. .................. 429/229 X |
| 3,838,367 | 9/1974 | Bex ...................................... 333/204 |
| 3,873,367 | 3/1975 | Kandler ............................. 429/229 |
| 3,876,470 | 4/1975 | McBreen ............................ 429/229 |
| 3,980,497 | 9/1976 | Gillman et al. ...................... 429/145 |
| 4,091,184 | 5/1978 | Erisman et al. ...................... 429/139 |

Primary Examiner—Bruce H. Hess
Attorney, Agent, or Firm—Wood, Herron & Evans

[57] ABSTRACT

A zinc or zinc oxide anode having at the center thereof a body of an inert absorptive material which establishes an anolyte reservoir within the anode itself. This reservoir is sandwiched between two laminates, each of which is preferably a three-layer integral laminate comprising a current collector, a zinc or zinc oxide active layer and a separator which presents the outside surface of the laminate. The anode displays low shape change in comparison to conventional anodes.

23 Claims, 3 Drawing Figures

INVENTION

4,292,357

ZINC/ZINC OXIDE LAMINATED ANODE ASSEMBLY

FIELD OF THE INVENTION

This invention relates to anodes for use in alkaline secondary cells of the type wherein zinc and/or zinc oxide is the major active component in the anode, such as those commonly referred to as "nickel/zinc" and "silver/zinc" cells. (As used herein, the term "zinc anode" is meant to include anodes wherein the active material is metallic zinc, zinc oxide, or a mixture of metallic zinc and zinc oxide.) More particularly, the invention relates to a novel anode construction for such cells.

BACKGROUND OF THE INVENTION

Although zinc alkaline cells display desirable characteristics in terms of high anodic voltage and high energy content per unit weight and volume, the zinc or zinc oxide-containing anodes of such cells display the unusual and disadvantageous characteristic of "shape change" over repeated discharging and recharging. "Shape change" generally refers to a gradual change in the shape of the anode, particularly the thickness of the active layer. The change is manifested as a gradual reduction in the thickness of active material at or near the edge of the anode and a gradual thickness increase toward the center. The thickness change is believed to result from disproportionate dissolution of the zincate ions by the electrolyte from the active material adjacent the edges of the anode and disproportionate reformation of zinc toward the center. In the process the binder material (which is commonly mixed in with the active material) tends to accumulate at the surface of the electrode. As the "shape" of the active layer thus changes, the performance of the cell diminishes. Whatever the precise mechanism, shape change results in reduced performance, in terms of energy content (ampere-hours).

Various proposals have been made for minimizing or reducing the undesirable effects of shape change, see for example U.S. Pat. Nos. 3,838,367 and 3,876,470, but they have been relatively complex or expensive to carry out. By reason of that undesirable affect, there has been a need for a zinc anode construction in which the shape change effect is reduced without serious cost penalties. The present invention accomplishes this result.

In a conventional zinc anode the active material is disposed on a current collector, on one or both sides of the current collector. This structure is wrapped or enclosed within a separator, or in any event is separated from the cathode in a cell by a separator. The current collector is usually of copper in a foraminous form such as a woven screen, an expanded sheet, or a die-cut sheet. The active layer is predominantly zinc and/or zinc oxide, and usually will comprise a mixture of zinc oxide with a lesser proportion of metallic zinc particles. Binders and various additives are sometimes included. The separator in which the active material/current collector structure is wrapped or encased, in an insulative, electrolyte-permeable material, usually a sheet material, and typically is a thermoplastic or thermoset. As assembled to form a cell or battery, one or more such anodes is disposed adjacent or between cathodes, e.g., of nickel oxide or silver oxide. The electrolyte is typically potassium hydroxide. For further background relating to conventional zinc oxide anodes for secondary cells, reference may be had to Falk & Salkind, "Alkaline Storage Batteries."

BRIEF DESCRIPTION OF THE INVENTION

In accordance with this invention, a new zinc anode structure is provided which is "inside-out" as compared to the conventional form of zinc anode. As a center element it has an absorbent layer or sheet which acts as an electrolyte (anolyte) reservoir, of small volume. This inert electrolyte-absorptive layer is sandwiched between a pair of current collectors, each of which is coated with (or is otherwise in electrical contact with) a zinc or zinc oxide active layer. The outside surface of each current collector/active material element is coated or covered with a separator material, or a separator is placed between the anode and cathode in assembly to form a cell.

In the preferred embodiment of the invention, each of the two current collector/active layer/separator elements is formed as an integral laminate, with a zinc or zinc oxide layer coated directly onto the current collector and the separator layer laminated or bonded directly to the face of either the current collector or the active layer. The center reservoir is provided by a sheet of electrolyte-absorptive inert material which is sandwiched between two separate current collector/active layer/separator laminates, or within a single laminate which has been folded in half around it. Those edges of the sandwich which in use are immersed in electrolyte, are preferably sealed with an electrolyte impervious sealant to prevent electrolyte from penetrating the separator layer at such edges. The anode thus formed can be assembled to form a couple with nickel oxide, silver oxide or other cathode constructions, in known manner.

BRIEF DESCRIPTION OF THE DRAWINGS

The invention can best be further described by reference to the accompanying drawings, in which.

Figure 1:
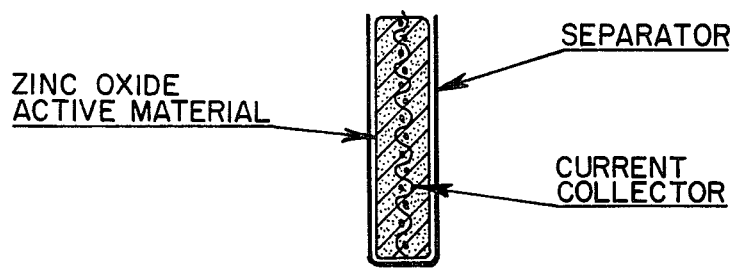
FIG. 1 is a cross section, somewhat diagrammatic in nature, of a conventional zinc anode construction.

The conventional form of zinc anode shown in FIG. 1 includes a current collector (shown as a woven screen), which is coated on both faces with a metallic zinc and/or zinc oxide-containing active layer and sheathed within an electrolyte permeable, electrically insulating separator sheet material. The anode may be generally rectangular in shape, although cylindrical or tubular electrodes with an axial current collector are sometimes used. In such prior art constructions, there is no internal anolyte absorbent sheet or reservoir; the electrolyte penetrates the anode through the separator from the outside.

By contrast, in this invention an electrolyte absorbent inert sheet or body 10 provides an internal anolyte reservoir at the center of the anode itself, between paired active layers 11, 11 and current collectors 12, 12. In the preferred form, reservoir 10 is sandwiched between elements 13, 13 which are formed as integral laminates, each including a current collector 12 (again shown for illustrative purposes as a woven screen), at least one zinc and/or zinc oxide active layer 11, and preferably a separator layer 14, all bonded together, so as to be handleable as a unit.

Figure 2:
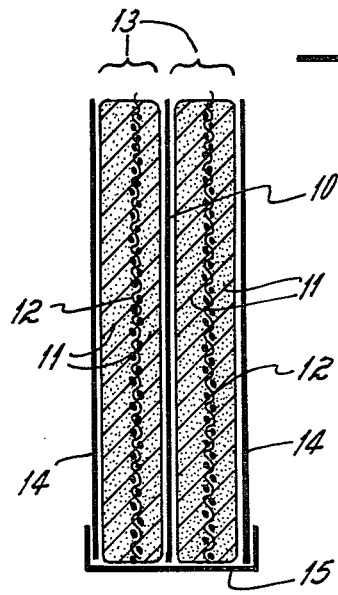
FIG. 2 is a diagrammatic cross section of a zinc anode in accordance with this invention.
Figure 3:
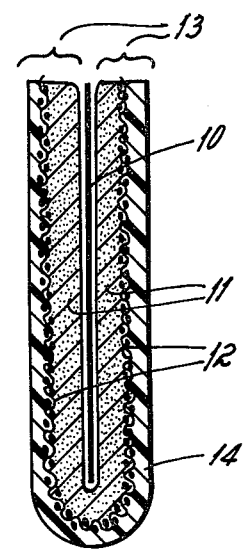
FIG. 3 is a diagrammatic cross section of a modified form of zinc anode in accordance with the invention.

In the FIG. 2 embodiment, the laminate 13 does not include the separator 14, which is a separate layer; in the FIG. 3 embodiment, the separator layer is itself an integral part of the laminate 13.

More specifically, each current collector/active layer/separator laminate 13 is preferably formed by applying or coating a zinc or zinc oxide composition of spreadable consistency onto a foraminous or perforated current collector 12. The current collector or grid may be of copper or other conductive material, in the form of a screen, expanded sheet, or die-cut sheet. The composition of the active material itself is not the invention, and may be conventional. Preferably it includes a particulate flake or fibrous inert binder, for example polyethylene microfibers such as are sold under the trademark "Microthene," or polyphenylene oxide fibers such as are sold under the trademarks "PPO" and "Noryl", or "Teflon" particles. These impart handleability and serviceability to the laminate by minimizing separation and flake-off of the active material from the screen. The active material may comprise zinc particles or zinc oxide alone, but preferably comprises a mixture of zinc oxide and up to about 25% (of total active material) of metallic zinc particles. It may also include an effective proportion, usually less than about 5%, of a conventional modifier or additive such as mercuric chloride or mercuric oxide, for controlling gas evolution and/or reducing overvoltage. The balance of the active layer, preferably at least 65% to 75% thereof, comprises zinc oxide. To this sufficient water is added to make a spreadable or coatable paste.

It will be appreciated that the invention is not limited to a specific active layer formulation, and further that a wide variety of separator and reservoir materials can be used. By way of example, one suitable composition for the active layer comprises:

| | |
|---|---|
| 75% | ZnO |
| 22% | Zn metal powder |
| 2% | Binder |
| 1% | Additive |
| 100% | |

It is a substantial advantage of the laminate form of the anode that production is greatly facilitated. The anodes can be made at a high rate by continuous lamination in large sheets, and cut to sizes as needed. The active composition, with water added for spreadability, may be continuously coated onto a current collector in extended sheet form, as for example by doctor blading, extruding, or vacuum deposition from slurry onto the sheet. Active layer 11 may be applied to one face only of the current collector 12; at present it is believed that single face application is adequate. Preferably the active layer should extend through the openings in the current collector, to better adhere to it. Thickness (after drying) is desirably in the range of about 5–50 mils, exclusive of the thickness of the collector.

After the active layer 11 has been applied to the current carrier 12, the two-layer laminate so formed is desirably pressed (as between rolls) to consolidate the active layer on the collector and to express excess water. The active layer may be dried then, but preferably this is done after a separator layer 14 has been coated on.

The separator 14 preferably is an inert electrolyte-permeable insulating material of a type known per se, for example a cellulosic separator material, which is sprayed or coated directly onto the current collector-active material laminate as an integral third layer thereof (FIG. 3). The separator may be applied either on the active layer itself or over the current collector (FIG. 3). Alternatively, but less advantageously, a separate (unlaminated) sheet of separator material may be placed outside of or around the structure (FIG. 2).

The drying of the active layer and, simultaneously or sequentially, the separator layer, if necessary, may be carried in the appropriate manner for the specific materials employed, as for example in an oven at 300°–500° F. After drying, the laminated elements 13 are quite durable and can be rolled for storage. Oversize sheets can be cut to desired size.

The electrolyte reservoir sheet 10 is placed between two separate laminates 13, 13 (FIG. 2) or a double area laminate is folded in half around the reservoir sheet 10 (FIG. 3). In either case a laminate-reservoir-laminate-sandwich is thereby formed. The electrolyte reservoir sheet may be an inert absorptive woven or non-woven sheet of nylon, rayon, polyethylene, orlon, polyester, or the like, for example in the range of 5 to 50 mils thick. The (three or four) edges of the sandwich which in use are immersed in electrolyte, are preferably coated with an electrolyte impermeable sealant or adhesive tape 15 (shown in section in FIG. 2). Where the anode is rectangular, the side and bottom edges will be immersed in electrolyte and these edges should be sealed, although the top edge may also be sealed.

In comparison with standard zinc anode design, cycle life improvements of 25% have been demonstrated in multi-cell lab test sets of the present anodes.

In the preferred embodiment disclosed, the separator is a part of the anode. Alternatively, the separator may be omitted as a part of the anode itself and a separate separator sheet may be placed between the anode and the cathode upon assembly as a cell.

Although the reason for the reduction in shape change demonstrated by this construction is not fully understood, it is believed that the improvement results from the fact that the internal anolyte reservoir largely retains within itself the dissolved zinc from the active material; and because the volume of this reservoir is large as compared to the catholyte volume. This insulative absorbent material inside the electrode helps to stabilize the zincate ion concentration within the electrolyte itself, even during rapid charging and at the end of the charge when zincate ion concentration in the immediate region of the anode usually decreases. The construction minimizes zincate ion concentration gradients within the cell; and this leads to minimum electrode shape change.

The dual current collectors 12, 12 control the plating sites from zinc deposits. In conventional anodes, during discharge oxidized zinc forms on the surface of the active material and dissolves in the electrolyte, and during charge metallic zinc is produced on or near the current collector. The net result is the movement and the loss of active material over repeated cycling. In this invention, the dual spaced current collectors electrochemically utilize the zinc oxide that precipitates from zincate in solution and the zinc dendrites that form on charge.

The edge sealant 15 contributes to the improved results because it seals out electrolyte at the edges of the anode. The presence of electrolyte at the edges of the zinc electrodes tends to create zincate ion concentration gradients and thereby provide an additional current path through the free electrolyte at the edges. Such an effect, together with the higher current density at the edges of the electrode, would contribute to shape change phenomenon in conventional anodes. In this invention, sealing the edges of the composite electrode provides a configuration in which the physical edges of the electrode are exposed to essentially the same volume of electrolyte, potential and current distributions, ionic concentration gradients and electrolyte flows, as other points on the electrode. In effect, the electrode tends to function as a continuous surface without discontinuities at its physical edges. Also, the edge sealing provides electrical insulation and isolation for the edges, which are a prime location for short circuiting to occur. It also minimizes dendritic zinc growth which is otherwise likely at electrode edges.

Having described the invention, what is claimed is:

1. A zinc anode comprising a series of parallel layers including
   a central layer of electrolyte-absorptive inert material which in use forms an internal electrolyte reservoir,
   said central layer of inert material disposed between two active elements each including,
   a foraminous current collector,
   each current collector having on at least one side thereof a zinc or zinc oxide active layer in electrical contact with the current collector,
   a zinc or zinc oxide active layer on the respective current collectors being adjacent the central layer.

2. The zinc anode of claim 1 wherein each active element also includes a separator on its outer surface.

3. A zinc anode comprising a series of parallel layers including
   a central sheet of electrolyte-absorptive inert material which in use forms an internal electrolyte reservoir,
   said central sheet of inert material disposed between two laminates, each laminate including,
   a foraminous current collector,
   a zinc or zinc oxide active layer in electrical contact with the current collector, and
   a separator layer,
   the respective active layers being adjacent said central sheet so that dissolved zinc from the active layers is substantially retained within the internal electrolyte reservoir,
   the respective separator layers forming the two outer surfaces of the series of layers.

4. A zinc anode comprising a series of parallel layers including
   a pair of foraminous current collectors,
   each current collector being in electrical engagement with a zinc or zinc oxide active layer on at least one face thereof,
   an electrolyte-absorptive inert material centrally disposed between the pair of current collectors and active layers engaged therewith, said inert material providing an electrolyte reservoir within the anode between the respective pair of collectors and active layers engaged therewith,
   a zinc or zinc oxide active layer on the respective current collectors being adjacent the inert material, and
   means securing said layers together to form a unitary anode.

5. The anode of claim 4 wherein each active layer is coated integrally onto the respective current collector.

6. The anode of claim 5 further including a separator layer coated integrally on each outside face of said series of layers.

7. The anode of claim 4 wherein said series of layers is sealed, by an electrolyte-impervious sealant, at the edges thereof which in use are immersed in electrolyte.

8. The anode of claim 4 wherein the said current collectors and active layers engaged therewith comprise the leaves of an integral sheet which is folded on itself, and
   the sheet of electrolyte-absorptive inert material is disposed between said leaves.

9. The anode of claim 4 wherein each active layer extends through the openings in the respective foraminous current collector.

10. The anode of claim 4 wherein each active layer includes a binder in the amount of approximately 1-10% by weight thereof.

11. The anode of claim 4 wherein each current collector is an apertured sheet of electrically conductive material, onto which the active layer is laminated.

12. The anode of claim 4 wherein each said active layer comprises zinc oxide and up to about 25% metallic zinc particles.

13. The anode of claim 4 wherein each said active layer includes fibers of an inert material as a binder therefor.

14. A method of forming a zinc anode which displays low shape change in cycling, comprising the steps of
   forming an integral laminate comprising a current collector and a zinc or zinc oxide active layer, the active layer comprising a zinc or zinc oxide composition which is deposited onto a current collector in the form of a foraminous sheet; and
   sandwiching a sheet of electrolyte-absorptive material between a pair of said integral laminates, thereby providing an assembly having an electrolyte reservoir sandwiched between two current collector-active layer laminates on the opposite sides thereof,
   the respective active layers being adjacent opposite faces of the sheet of electrolyte-absorptive material.

15. The method of claim 14 including the further step of laminating a separator layer onto the said laminate.

16. The method of claim 15 wherein the separator layer is laminated by spraying it thereon.

17. The method of claim 15 wherein the active layer is laminated on the current collector, and
   the separator layer is laminated over the active layer.

18. The method of claim 15 including the further step of folding a current collector-active layer-separator layer laminate on itself so that the separator layers are on the outside, and
   sandwiching the sheet of electrolyte-absorptive inert material within the leaves of the folded laminate.

19. The method of claim 14 wherein the active layer is laminated on the current collector by doctor blading.

20. The method of claim 14 wherein the active layer is laminated on the current collector by extrusion.

21. The method of claim 14 wherein the active layer is laminated on a woven screen as the current collector.

22. The method of claim 14 wherein the active layer is laminated onto both faces of the current collector such that a zinc or zinc oxide active layer on the respective current collectors is adjacent opposite faces of the sheet of electrolyte-absorptive material.

23. The method of claim 14 including the further step of
   sealing the edges of said sandwich which in use will be immersed in an electrolyte.

* * * * *